United States Patent
Benoit et al.

(10) Patent No.: US 11,714,549 B2
(45) Date of Patent: Aug. 1, 2023

(54) DEEP CAUSAL LEARNING FOR DATA STORAGE AND PROCESSING POWER MANAGEMENT

(71) Applicant: 3M INNOVATIVE PROPERTIES COMPANY, St. Paul, MN (US)

(72) Inventors: Gilles J. Benoit, Minneapolis, MN (US); Nicholas A. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/797,933

(22) PCT Filed: Feb. 18, 2021

(86) PCT No.: PCT/IB2021/051395
§ 371 (c)(1),
(2) Date: Aug. 5, 2022

(87) PCT Pub. No.: WO2021/171152
PCT Pub. Date: Sep. 2, 2021

(65) Prior Publication Data
US 2023/0119999 A1    Apr. 20, 2023

Related U.S. Application Data

(60) Provisional application No. 62/982,874, filed on Feb. 28, 2020.

(51) Int. Cl.
*G06F 3/00* (2006.01)
*G06F 3/06* (2006.01)

(52) U.S. Cl.
CPC .......... *G06F 3/0604* (2013.01); *G06F 3/0658* (2013.01); *G06F 3/0685* (2013.01)

(58) Field of Classification Search
CPC ..... G06F 3/0604; G06F 3/0685; G06F 3/0658
See application file for complete search history.

(56) References Cited

U.S. PATENT DOCUMENTS 9,922,293 B2 *   3/2018   Brooks ............... G06Q 50/06
2010/0115220 A1  5/2010   Lee et al.
(Continued)

FOREIGN PATENT DOCUMENTS

JP    2019160306 A    9/2019
KR    20180068271 A   6/2018
(Continued)

OTHER PUBLICATIONS

International Search Report for PCT Application No. PCT/IB2021/051395, dated May 21, 2021, 4 pages.
(Continued)

*Primary Examiner* — Craig S Goldschmidt

(57) ABSTRACT

Method for active data storage management to optimize use of an electronic memory. The method includes providing signal injections for data storage. The signal injections can include various types of data and sizes of data files. Response signals corresponding with the signal injections are received, and a utility of those signals is measured. Based upon the utility of the response signals, parameters relating to storage of the data is modified to optimize use of long-term high latency passive data storage and short-term low latency active data storage.

20 Claims, 6 Drawing Sheets

(56) References Cited

U.S. PATENT DOCUMENTS

| | | |
|---|---|---|
| 2011/0231620 A1 | 9/2011 | Lee et al. |
| 2012/0150508 A1 | 6/2012 | Wikström et al. |
| 2019/0244663 A1 | 8/2019 | Tomita |
| 2019/0286991 A1 | 9/2019 | Lee et al. |
| 2019/0303028 A1* | 10/2019 | Rawal .................. G06F 3/0604 |
| 2019/0318228 A1 | 10/2019 | Kim et al. |
| 2022/0137565 A1 | 5/2022 | Brooks et al. |

FOREIGN PATENT DOCUMENTS

| | | |
|---|---|---|
| KR | 20190030193 A | 3/2019 |
| WO | 2011120019 A2 | 9/2011 |
| WO | 2013101947 A1 | 7/2013 |
| WO | 2020188331 A1 | 9/2020 |
| WO | 2021171156 A1 | 9/2021 |

OTHER PUBLICATIONS

International Search Report for PCT Application No. PCT/IB2021/051443, dated Apr. 19, 2021, 4 pages.

Wikipedia, "Hessian Matrix", Retrieved from Internet in 2019, Available Online at URL <"https://en.wikipedia.org/w/index.php?title=Hessian_matrix&oldid=892343368>, 5 pages.

Wikipedia, "Jacobian Matrix and Determinant", Retrieved from Internet in 2019, Available Online at URL <https://en.wikipedia.org/w/index.php?title=Jacobian_matrix_and_determinant&oldid=907991614>, 9 pages.

Wikipedia, "Model Predictive Control", Retrieved from Internet in 2019, Available Online at URL <https://en.wikipedia.org/w/index.php?title=Model_predictive_control&oldid=906967598>, 8 pages.

* cited by examiner

DEEP CAUSAL LEARNING FOR DATA STORAGE AND PROCESSING POWER MANAGEMENT

CROSS REFERENCE TO RELATED APPLICATIONS

This application is a national stage filing under 35 U.S.C. 371 of PCT/IB2021/051395, filed Feb. 18, 2021, which claims the benefit of U.S. Provisional Application No. 62/982,874, filed Feb. 28, 2020, the disclosures of which are incorporated by reference in their entireties herein.

BACKGROUND

Passive observational machine learning is often referred to as Big Data because of the large amount of data required to train these models. While the resulting models may be small enough to be deployed in applications with limited data storage and/or computational capability, their external validity is limited to the historical state space sampled. As the world changes their accuracy decreases, which can result in catastrophic consequences. Updating these models requires a large amount of memory and processing power and must therefore be accomplished using cloud computing or a separate device, resulting in significant latency associated with data transfer and retraining of model.

Active machine learning methods, such as reinforcement learning, accrue data over time at a rate depending upon the frequency in which actions are taken and rewards are received (e.g., one action reward pair every second, every minute, or other time duration). Furthermore, their internal validity rests on the assumption that the reward distributions of candidate actions follow a known distribution, while their external validity can rest on the assumption these distributions are stationary over time. Some algorithms such as Upper-Confidence Bond (UCB) require a known family of distributions (i.e., sub-Gaussian distributions which includes normal distribution, uniform distribution, or others). Also, some methods work in adversarial scenarios where an adversary can choose the reward distribution arbitrarily from known families of adversaries. When these assumptions are broken, as is often the case, there are no mechanisms to determine which and how much data to keep to ensure convergence and minimize regret.

SUMMARY

There is a need for new machine learning techniques that solve the dilemma of which and how much data to keep in memory to perform optimally and that can estimate the marginal impact of removing additional datapoints in order to operate optimally under the constraints of limited data storage, computing power, and/or latency.

A first method for active data storage management includes injecting randomized controlled signals into an electronic memory and storing repeated effect measures for each control signal. The method also includes computing a marginal value of storing an additional effect measure in the memory for each control signal and determining, based on available data storage capacity in the memory and the marginal value of an additional data point for each control signal, whether to accrue, replace or remove stored data points.

A second method for active data storage management includes injecting randomized controlled signals in storing of data in an electronic memory and ensuring the signal injections occur within normal operational ranges and constraints. The method also includes monitoring performance of the memory in response to the controlled signals, computing confidence intervals about the causal relationships between the memory performance and the controlled signals, and selecting optimal signals for the storage of data in the memory based on the computed confidence intervals.

A third method for active data storage management includes providing signal injections for storing data in an electronic memory and receiving response signals corresponding with the signal injections. The method also includes measuring a utility of the response signals, accessing parameters relating to storing the data in a long-term memory and a short-term memory, and modifying the data based upon the utility of the response signals.

DETAILED DESCRIPTION

Figure 1:
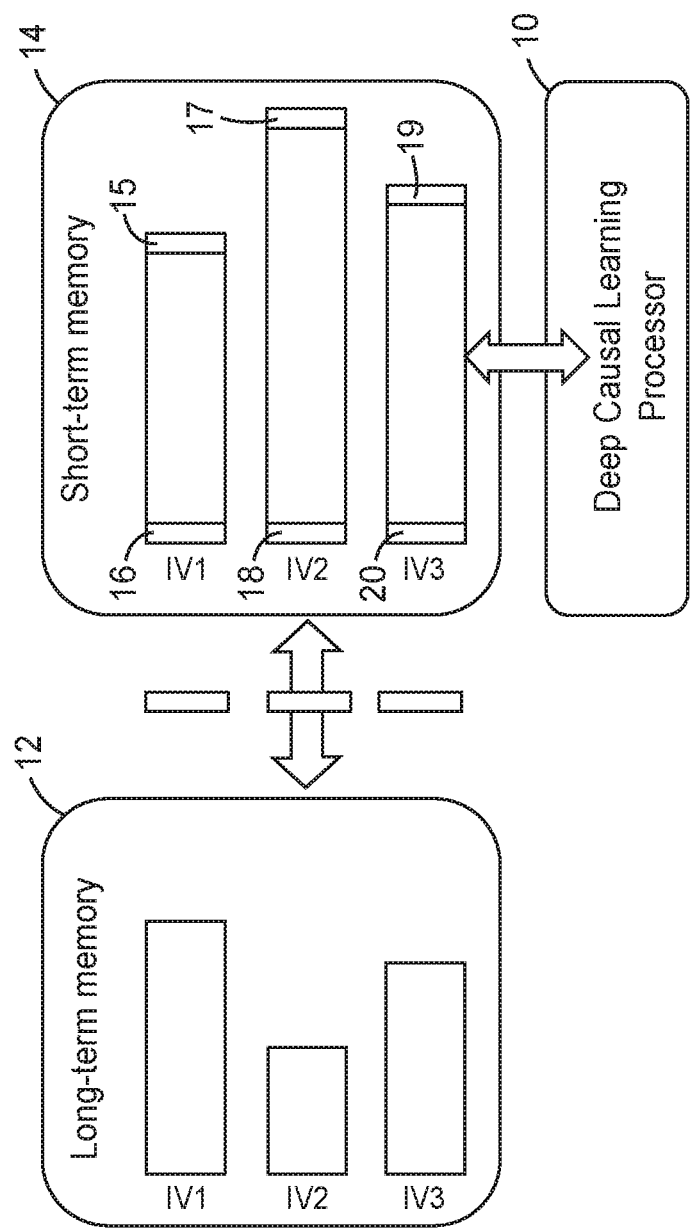
FIG. 1 is a diagram illustrating a system for managing data storage and processing power.

Deep Causal Learning (DCL) provides a robust prescriptive analytics platform with broad applicability for process control automation and optimization. One attribute of DCL is that it can perform optimally on a finite data set, allowing it to continuously discard historical data at the same rate that it acquires new data. As a result, the amount of data storage required to run DCL and the speed at which DCL processes that data are both finite and bounded. Furthermore, DCL can precisely compute the opportunity cost of further reducing that data set with respect to system performance, providing it with the ability to optimize the amount of data storage and computing capability for a particular application and/or optimize which and how much data to store in applications where data storage and computing capability are severely or possibly limited.

Examples of DCL algorithms and parameters are disclosed in WO 2020/188331, which is incorporated herein by reference as if fully set forth.

DCL can enable efficient artificial intelligence in applications where energy/power consumption is at a premium (e.g., mobile devices such as handheld smart phones, autos, airplanes), where data storage and/or computing power is limited (e.g., edge devices, Internet of Things (IoT)), where bandwidth is limited (e.g., remote locations), where latency must be kept low (i.e., high computing speed), and other such applications where long-term costs of storage and computing are constrained.

DCL computes cause and effect relationships through randomized controlled experimentation. A product of that process is a set of time series representing repeated effect measures of possible actions (independent variable (IV) levels) on system outcome (dependent variables (DVs) and figures of merit (FOM)) called d-scores, where d-scores are essentially effect measures. These time series are used to compute confidence intervals representing the uncertainty in the estimation of the underlying causal effects. The overlap between these confidence intervals provides a metric to quantify the uncertainty in decision making, whereby less overlap indicates less uncertainty about which action/setting to select in order to improve an outcome such as system performance.

As DCL collects new data and its experimental data set grows, the confidence intervals become narrower over time reflecting greater precision around the expected outcomes of each possible level. If the causal effects are statistically different across levels, their overlap becomes progressively smaller to the point where they no longer overlap. At that point, the marginal value of each additional data point is essentially zero since additional precision does not reduce the uncertainty in decision making, and the optimum decision is already known with 95% confidence, for example. If the causal effects are not statistically different across levels, then their overlap remains largely unchanged over time. The marginal value of each additional data point is essentially zero again since additional precision does not reduce uncertainty in decision making, and the levels associated with these overlapping confidence intervals are expected to have statistically equivalent outcomes. More generally, the marginal value of each additional data point can be estimated based on its ability to reduce overlap between confidence intervals and therefore reduce uncertainty in decision making. Given a finite data storage capacity, the marginal value of each additional data point can be calculated for each variable and used to optimally allocate any remaining capacity to future experiments and optimally remove experiments with low marginal value once at capacity. The same method can be used to maintain the latency speed below a prescribed threshold value.

FIG. 1 illustrates this split between long-term high-latency passive data storage 12 and short-term low-latency active data storage 14, along with marginal values of data points, under control of DCL processor 10. Data storage 12 and data storage 14 can be implemented with electronic memory or data storage devices. For IV1, the marginal value of adding a new data point is low (15), and the marginal value of removing a data point is high (16), which represents an opportunity to reduce the data set for IV1. For IV2, the opposite is true, the marginal value of adding a new data point is high (17), and the marginal value of removing a data point is low (18). For IV3, an old data point (20) can be removed with each new data point (19).

The marginal value captures the potential reward of, and risk (such as opportunity costs) of not, collecting new data points. Both the risk and the reward are to be further weighted by other factors such as, for example, the cost of collecting new data points (which may differ across variables) or the risk of violating system constraints. Other constraints may include financial constraints, for example managing the cost of running the application algorithms and storing data in the cloud.

When the system and its causal relationships change over time, it is possible that the marginal value does not uniformly converge to zero. In that case, DCL computes a data inclusion window for each variable that represents the optimum data size that most accurately represent the current state of the system while maintaining appropriate precision to drive system improvements. The data inclusion window can itself be used to determine a first finite data size for the historical data set, and the methods described herein can then be applied within that first finite data size to further optimize data storage allocation.

In many instances, it may be necessary to keep all historical records (e.g., to comply with regulatory requirements). In that case, an additional long-term data storage capacity can be added to collect the discarded data points while keeping the relevant data in short-term memory. The long-term data storage solution does not need to meet the requirements of the application for speed or ease of access and may be associated with high latency and/or intermittent access. Similarly, only an active subset of the experimental data may be stored (e.g., fields that are in fact used to compute the confidence intervals such as d-scores) in short-term/local memory while passive experimental data that may have been used to generate this active data set (e.g., individual experiment outcomes used to compute the d-scores by pair matching) or to characterize individual experiments (e.g., the state of the variables kept constant or the experimental block) may be stored in long-term/cold memory.

In addition to optimizing which and how much data to keep within a single limited data storage capacity or node, DCL can optimize the level of decentralization (center versus edge implementation) given a central data storage node with a given set of properties (size, latency, memory, computational power) and a set of edge data storage nodes with a different set of properties. The reinforcement learning (RL) part of DCL drives optimum decision making given a set of confidence intervals. These confidence intervals are computed from the d-scores, which tend to be normally distributed over the data inclusion window as a natural consequence of the DCL process. As a result, it is straight forward to compute the effect of an additional data point (N+1) on the width of the confidence intervals, which varies as sqrt(N). This marginal reduction in confidence intervals can then be passed to the RL module to estimate the marginal change in decision making and therefore expected utility of that same data point. For example, one can use the two sets of confidence intervals (measured with N points and estimated with N+1 points) to compute two sets of probabilities of picking each level of an independent variable and in-turn compute an expected outcome value under both sets of confidence intervals. The delta in outcomes represents the marginal value of that additional data point. For the sake of illustration, consider an example where DCL experiments across a population (e.g., a set of patients, a fleet of vehicles, a group of drones, a battery pack, manufacturing plants). Initially, DCL starts with little to no data and can most effectively deliver optimum decisions by running in a centralized mode where the data is aggregated onto a centralized storage and computing unit. Unless there is prior evidence that subpopulations respond differently to treatments, it is more optimum to gather all data together initially to maximize statistical power.

As data accumulates and DCL uncovers variance across subpopulations in their response to interventions (levels, actions, settings, policies), it initiates clustering, breaking the historical data set along the same lines. At that point, DCL can determine whether to keep the clusters aggregated at the central node, whether to push the data to each member of each subpopulation or, when applicable, to create a partly decentralized architecture where intermediate nodes are created between individuals and the central unit with their own storage and computing units. In the latter case, each intermediate node repeats the above process acting effectively as a centralized node but with a connection to a centralized data storage unit. Another option is that the intermediate nodes only implement a sub-set of DCL processes (e.g., excluding clustering), leaving the remaining (more computationally intensive) ones to the highest-level central node.

DCL can operate in the entire centralized/decentralized spectrum. For example, DCL can be used in a fully-decentralized way by running an instantiation of DCL on each node in a network. Each node computes its own d-scores and confidence intervals and can communicate data with its directly connected neighbors. Each node can use data from its neighbors to refine d-scores and confidence intervals based on how similar the node is with its neighbors. In this way, each node maintains its own causal model and refines it only using other local causal models but not a single, centralized model.

For example, consider automobiles as nodes in a network and the topology of the network can be constructed by connecting automobiles that are of the same type (sedans, trucks, etc.) or in the same location (e.g., cars in Minnesota are fully-connected and also connect to cars in neighboring states such as Iowa and Wisconsin). The benefits of such a decentralized DCL is that, for cars that mostly drive within their network, the causal model can be learned faster by using data from neighbors and can still be personalized to each individual vehicle.

However, if one often drives from Minnesota to a different state (such as Texas), the causal model learned from neighbors (from Iowa and Wisconsin) may not be optimal for Texas. In such a case, a fully-decentralized DCL may not be best. However, one can use DCL in a semi-decentralized way by now having each node occasionally communicating with a centralized entity by sending its own causal model and receiving the causal model from the centralized entity which consolidates all the causal models from all nodes in the network. In this way, a car in Minnesota learns a personalized causal model which is optimal for Minnesota and surrounding states (Iowa and Wisconsin), but since the node communicates with a centralized entity, it also has a (rough) causal model for far-away states such as Texas. So when a car drives from Minnesota to Texas, it can perform better since it starts with causal models for each state it drives enroute rather than only having a model for Minnesota.

Now, the data and communication overhead does increase as one goes from fully-decentralized to completely centralized and one can determine, based in their specific needs, where on the spectrum to be and can use DCL in that way.

Finally, DCL can operate in a fully-decentralized architecture where an instance of DCL is running on each node and maintains its own d-scores and confidence intervals. Occasionally, each node shares its information with its neighboring nodes (or all nodes) and then each node updates its own d-scores and confidence intervals based on the neighbor information through meta-analysis. This allows faster computation and less data storage on each node and performs (almost) as optimally as having a single, centralized DCL across all nodes. The amount of sub-optimality can be characterized based on the frequency of data sharing between nodes and the topology of the network.

As an example, for automotive applications DCL can determine how much data to locally store on the vehicle rather than data stored remotely via a network. Such data can be associated with any and all variables controlling operation of the vehicle, and DCL can consider a cost function of retaining versus not retaining the data, which is dynamically and contextually updated based on the condition of the vehicle, its environment, driver preferences and more.

For example, powertrain calibration involves the tuning of a vehicle's control algorithms to meet performance, fuel economy, emissions, and drivability specifications. DCL can be used to continuously optimize the parameters of these control algorithms across a fleet of vehicles. Initially, with small amounts of data, the marginal value of data points across all independent variable levels is high and the marginal value of clustering is negative. As data accumulates, DCL detects that time and location are effect modifiers for some of the independent variables and that different optimum levels are possible based on time of the year and geographic location of the vehicle. With enough data available, the marginal value of clustering becomes positive and DCL generates decentralized nodes corresponding to different regions and different months of the year. As more data accumulates, DCL further detects that driver behavior is another effect modifier for a few independent variables. Because every driver is different, DCL determines that optimizing each one of these independent variables on an individual basis has a positive marginal value and further decentralize randomized controlled experimentation on these specific independent variables at a single vehicle level. So while certain control algorithm parameters are optimized at the fleet level, others are personalized to a particular driver.

In another example, DCL is applied to optimizing an application on a cell phone. Initially DCL optimizes the parameters of the app across all users and progressively within clusters of users as already described. DCL further detects that cell coverage and battery life are also strong effect modifiers for a particular independent variable. However, these two external variables vary quickly in time and DCL must have the ability to change the implemented level of that independent variable at least as quickly to exploit this finding Because of the average latency between the cell phones and the central node, DCL determines that this independent variable must be optimized contextually at the edge, on each individual device. Furthermore, the confidence intervals for that independent variable also vary significantly across clusters of users. To reduce the computing load at the edge, DCL specifies only a sub-set of all possible levels within each user cluster (e.g., 3 levels) for that independent variable. So while all levels of the independent variable are being explored and exploited at the population level (i.e., across all devices), only a small sub-set is at the device level. All the data associated with other independent variables is stored and processed at a centralized/cloud location. On each device, a minimum set of DCL processes is implemented (e.g., clustering is ignored) and the data stored locally is limited to the prescribed sub-set of levels only within their associated data inclusion window.

In general, a decentralized or intermediate node only operates on a subset of individuals and/or time windows corresponding to a subset of clusters defined by the central node. From the center to edge, the information being transmitted specifies which cluster(s) and therefore individuals to act on and provides a contextual causal model used for optimizing local decision making. From edge to center, the information being transmitted is the updated local causal model (essentially the d-scores) such that the intermediate and centralized nodes can aggregate the d-scores across clusters into a holistic causal model and continue to test for exchangeability to determine whether new clusters should be generated. The clustering process can be conducted as a single instance at the most centralized level or can itself be broken down into multiple instances at intermediate nodes or both.

Clustering may be variable specific and, therefore, the decentralization process need not be homogeneous across all variables. For some variables the historical data and decision process can be pushed to the edge while for other variables there may be no benefit in doing so or doing so may have negative consequences due to data storage and or computing power limitations. This process can be optimized as before by computing the marginal value of additional data points for each variable within each cluster, taking into account the local/edge risk and reward characteristics that may be different across clusters and/or individuals (e.g., differential pricing, capacity, opportunity costs) and may vary over time, (e.g., variable costs, latency, maintenance).

Figure 2:
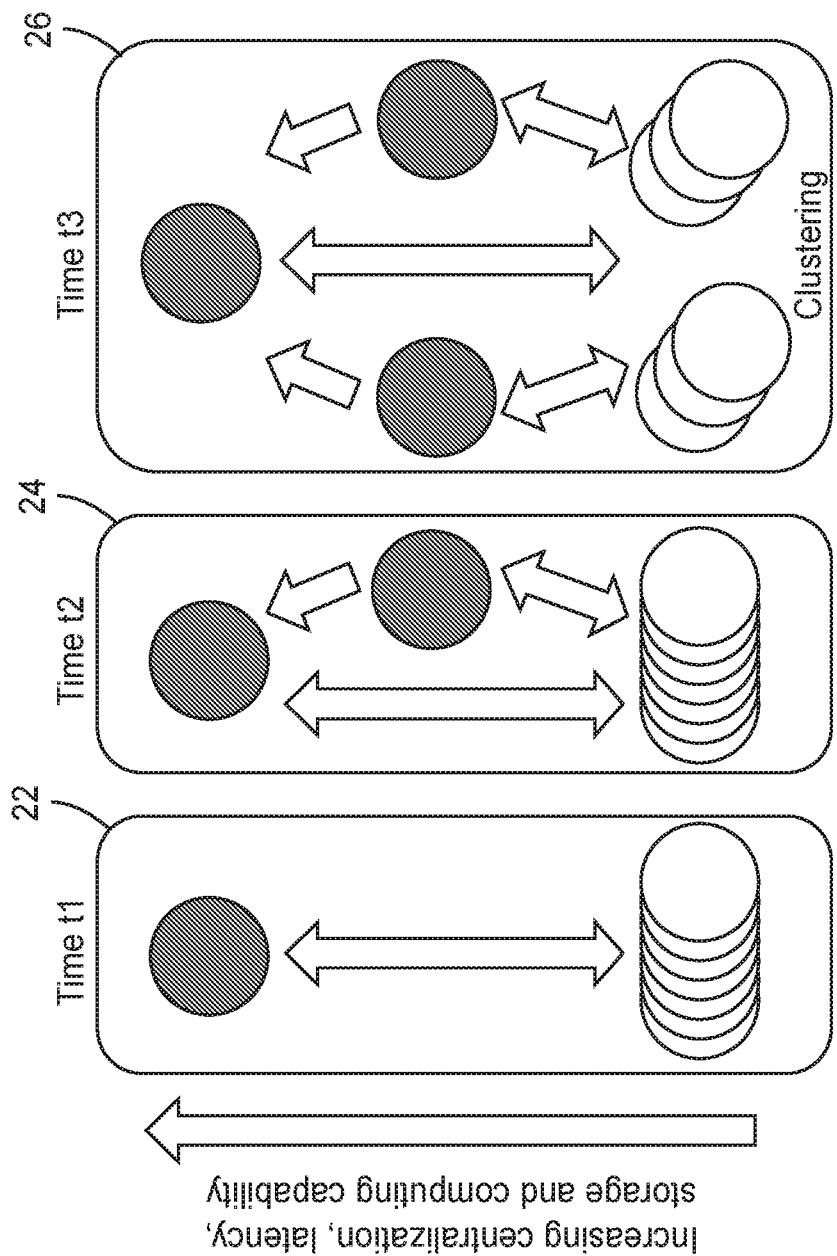
FIG. 2 is a diagram illustrating a self-organized node architecture.

FIG. 2 illustrates a self-organized node architecture where each node (shown as a circle) represents a data storage and computing unit. FIG. 2 further illustrates an architecture 22 operating at time t1, an architecture 24 operating at time t2, and an architecture 26 operating at time t3. Nodes can operate in parallel or a subset of nodes can be prioritized over others that can stay dormant until the marginal value of activating them surpasses the marginal cost, including opportunity costs, of activation.

At the highest level, DCL can generate this self-organized network of data storage and computing units that comprises cloud/central and physical/edge units and optimally distribute the data storage and computing load across that network provided such resources are available. Based on precise quantification of the costs and benefits (marginal values) of processing the data at different nodes and locations, an optimization function is established for optimizing the DCL network architecture and, therefore, a rational process for self-organization. Once clustering is initiated, additional constrains may exist such as reducing bias between subpopulations based on regulatory, ethical, and other societal considerations.

Bias can take different forms from differences in outcomes across subpopulations to differences in the precision and accuracy of the causal model. The confidence intervals provide a mechanism to quantify the later and incorporate the notion of fairness as part of the multi-objective optimization by ensuring uniform precision and accuracy across all subpopulations. Clustering provides a partial mechanism to quantify and remedy the former by ensuring that the best possible treatment is provided to each subgroup. Each group may have a different optimum treatment associated with different outcomes. This type of bias in treatment outcomes can only be remedied by allowing new treatment options to be introduced and tested for effectiveness, hence the value of being able to dynamically add and remove independent variables and/or levels in DCL. When a variable and/or level has a positive outcome within one cluster but a negative outcome in another cluster, it can be eliminated from the options available for the latter cluster (in instances that do not require all treatments to be available all the time), thus further reducing the size of the dataset kept in memory and the computing power required, a process known as dimensionality reduction.

As with other hyperparameters and internal processes of DCL, baseline monitoring can be used to assess and validate the external validity of the data management policies being generated. The delta between exploit and baseline, or pure explore, provides an objective measure of the utility delivered by DCL over time.

FIGS. 3-6 are flow charts of DCL methods for data storage and processing power management to optimize profiles and parameters for use of data storage and processing power. These methods can be implemented in, for example, software modules for execution by processor 10.

Figure 3:
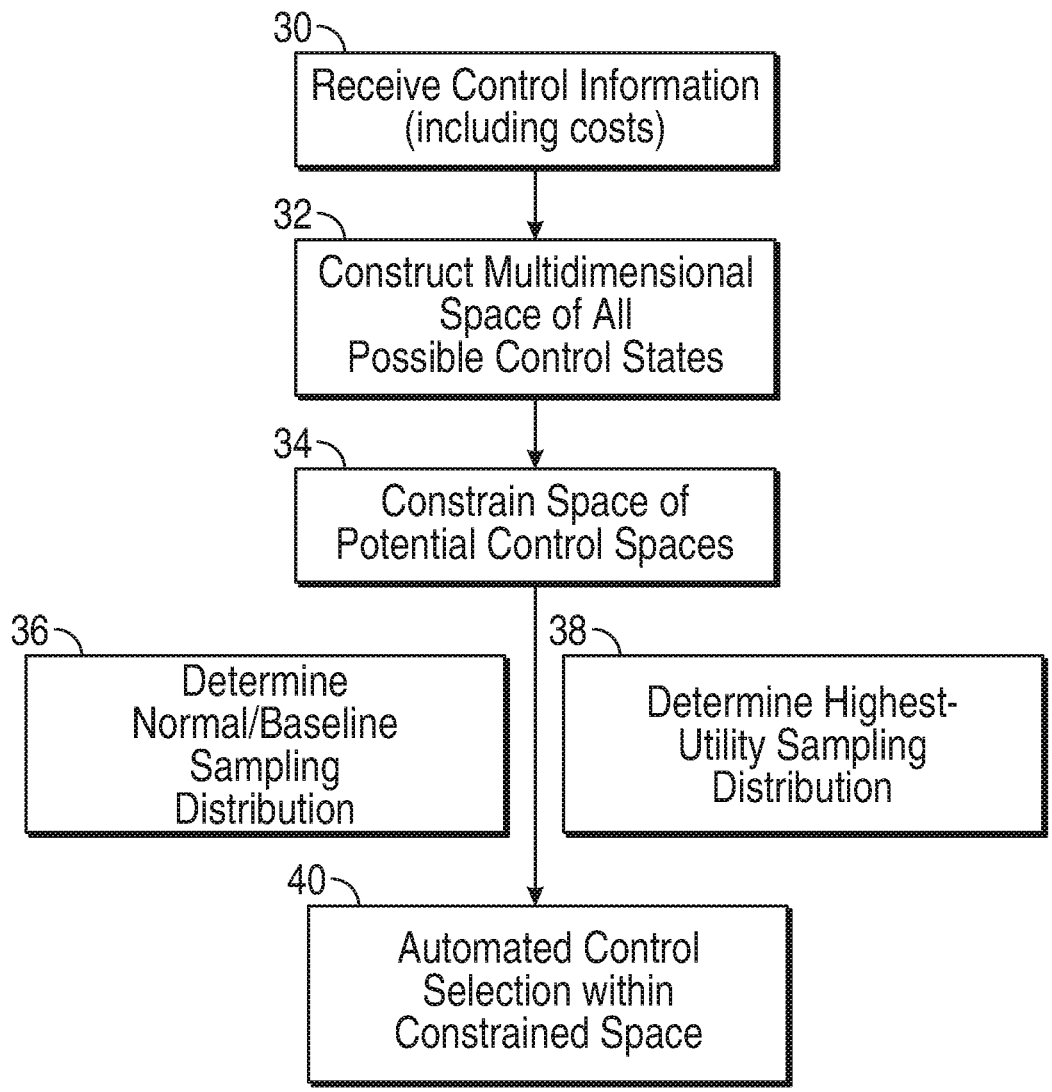
FIG. 3 is a flow chart of a search space method for the system.

FIG. 3 is a flow chart of a search space method. The search space method includes the following steps: receive control information (including costs) 30; construct multidimensional space of all possible control states 32; constrain space of potential control spaces 34; determine normal/baseline sampling distribution 36; determine highest utility sampling distribution 38; and automated control selection within constrained space 40.

Figure 4:
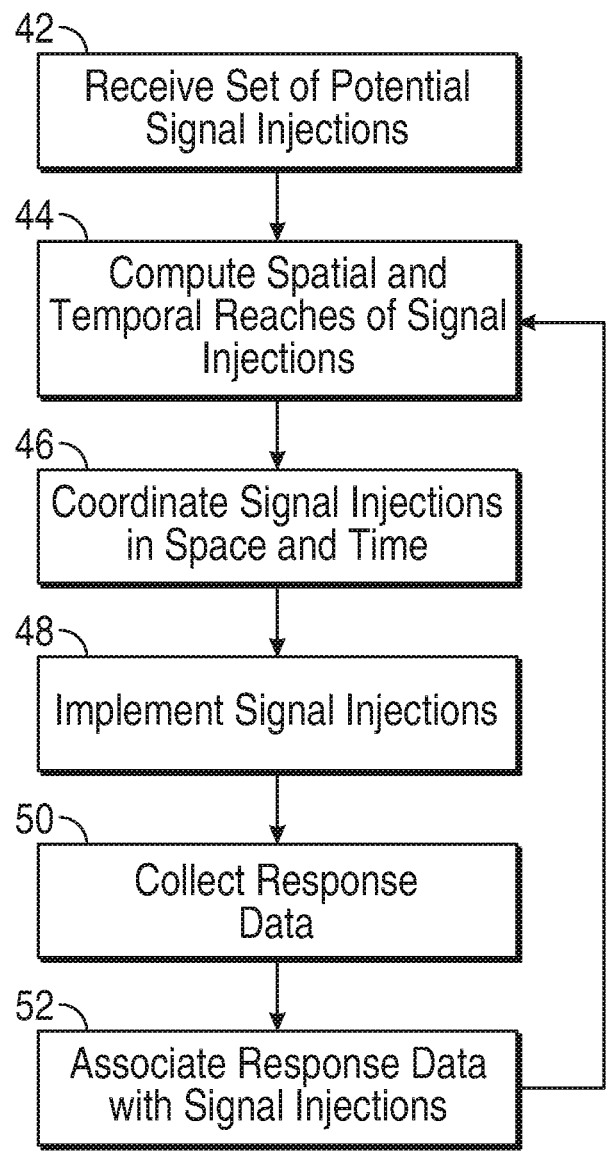
FIG. 4 is a flow chart of a signal injection method for the system.

FIG. 4 is a flow chart of a signal injection method. The signal injection method includes the following steps: receive set of potential signal injections 42; compute spatial and temporal reaches of signal injections 44; coordinate signal injections in space and time 46; implement signal injections 48; collect response data 50; and associate response data with signal injections 52.

The signal injections are changes in profiles and parameters for data storage and processing power management. The responses to signal injection are typically data storage and processing power performance resulting from or related to the changes in profiles and parameters from the signal injections. For example, the algorithm can perturb values in a look-up table representing data storage and processing power profiles and parameters, and then monitor and store the corresponding data storage and processing power performance response. The temporal and spatial reaches of signal injections relate to, respectively, when and where to measure the response signals to those signal injections that are used for computing causal relationships. The cost of signal injection typically relates to how the signal injection affects data storage and processing power performance, for example signal injection can result in greater data storage and slower processing performance, and is controlled by the specified experimental range. The queue for signal injection involves the order and priority of signal injections and relies on blocking and randomization to guarantee high internal validity at all times, even when optimizing utility. The utility of responses to signal injection involves the effectiveness of the signal injections or other measures of utility.

Figure 5:
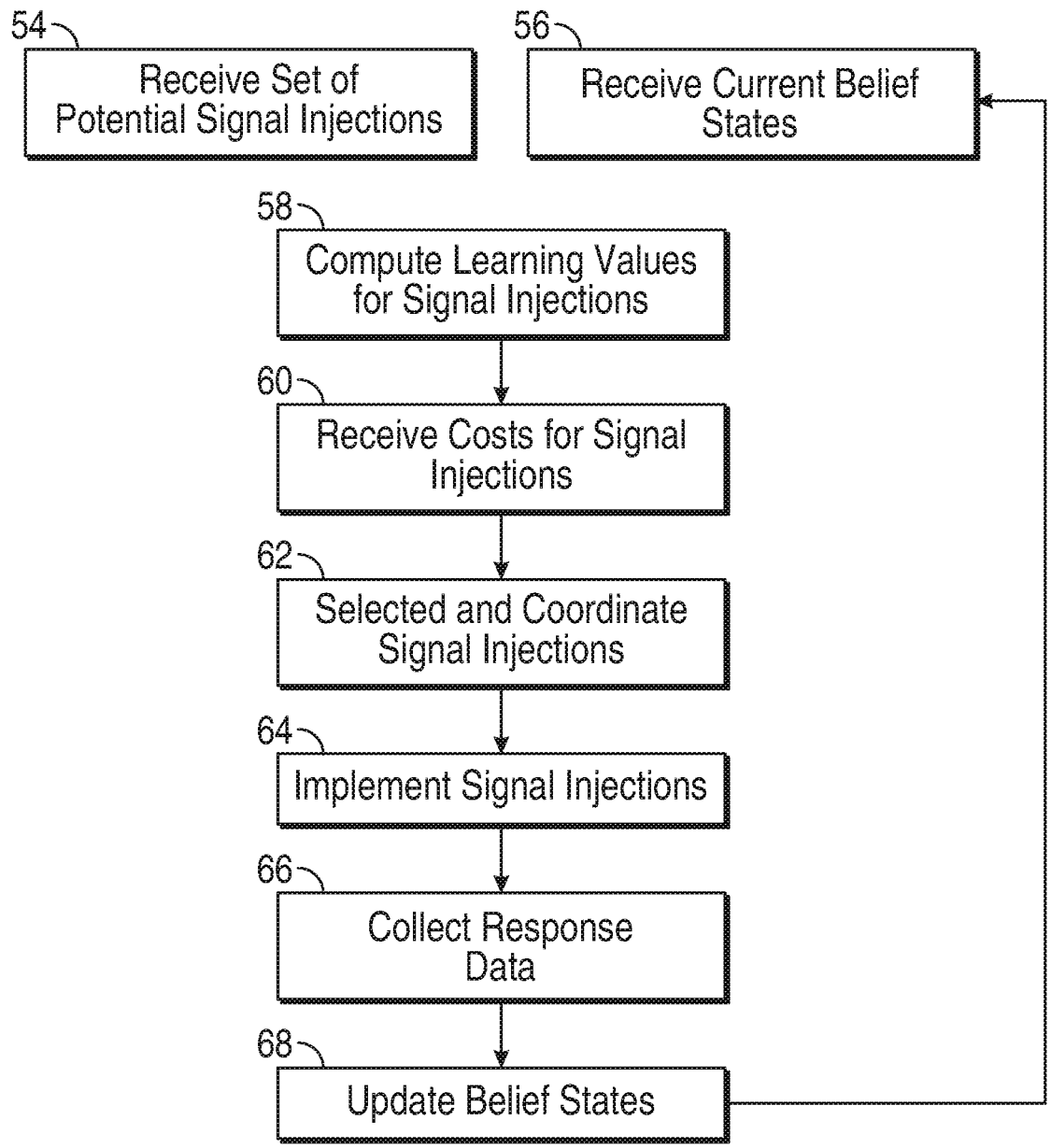
FIG. 5 is a flow chart of a continuous learning method for the system.

FIG. 5 is a flow chart of a continuous learning method. The continuous learning method includes the following steps: receive set of potential signal injections 54; receive current belief states 56; compute learning values for signal injections 58; receive costs for signal injections 60; select and coordinate signal injections 62; implement signal injections 64; collect response data 66; and update belief states 68.

The belief states are a set of different models of data storage and processing power performance in response to how data storage and processing power are used. These belief states may have attached uncertainty values reflecting the likelihood that they are accurate given the current set of trials and knowledge that may tend to confirm or falsify these different models, and the information that can further confirm or falsify the models may be included in this data or derived from the basic characteristics of the particular model and the physics of the underlying system.

The learning value is a measure of the value that knowledge generated as a result of the signal injection may provide to subsequent decision-making by a system, such as determining that a particular profile is more likely to be optimal. In the sense of a multi-objective optimization, this can include complex trade-offs between operational goals (e.g., performance versus range) and where optimality may vary over time. The learning value may be computed through, for example, predicting the raw number of belief states that may be falsified according to the predictions of a Partially Observable Markov Decision Process (POMDP) or other statistical model, predicted impacts of the signal injection on the uncertainty levels in the belief states in such models, or experimental power analyses computing the reduction in uncertainty and narrowing of confidence intervals based on increasing to the current sample size.

Figure 6:
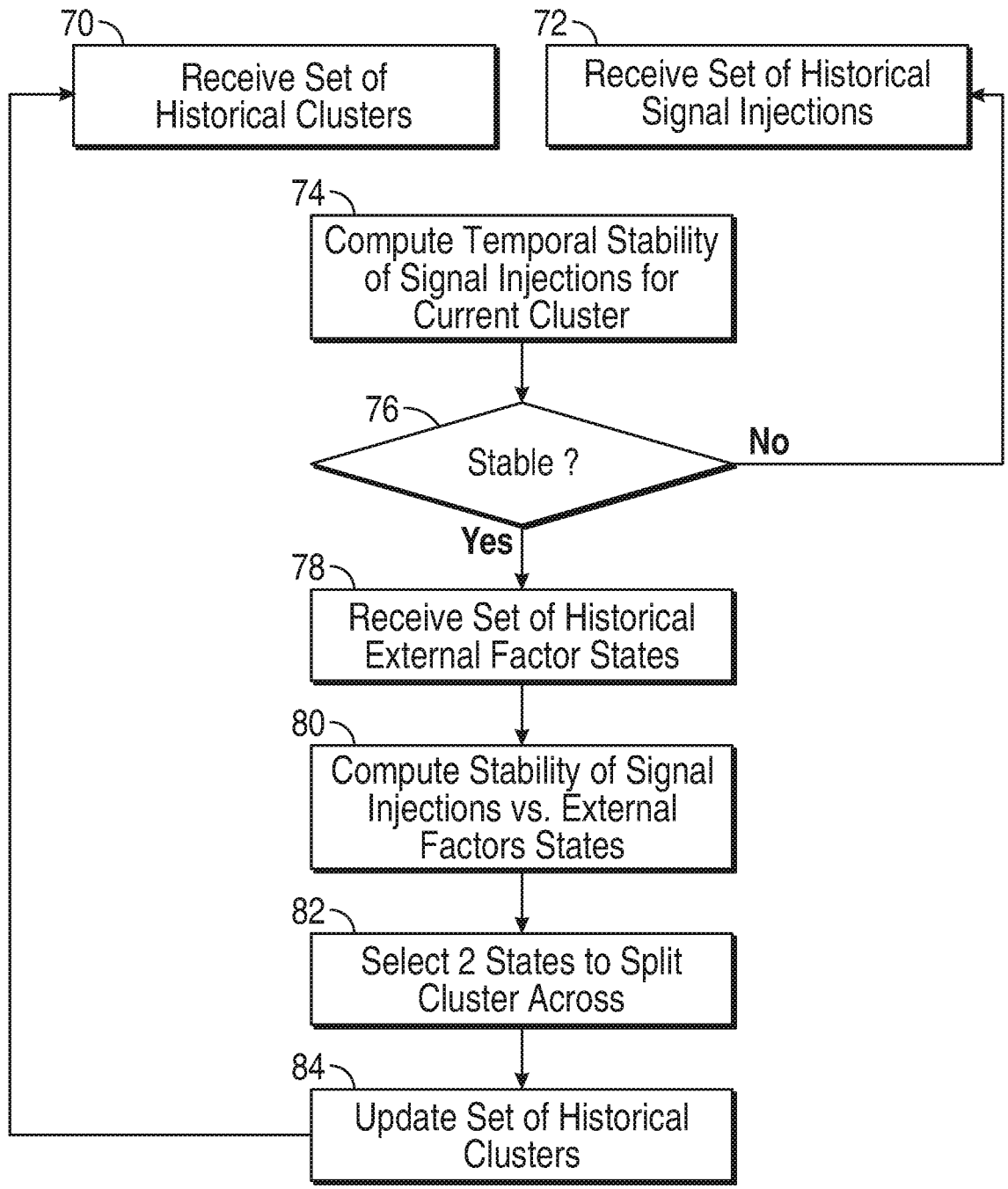
FIG. 6 is a flow chart of a memory management method for the system.

FIG. 6 is a flow chart of a memory management method. The memory management method includes the following steps: receive set of historical clusters 70; receive set of historical signal injections 72; and compute temporal stability of signal injections for current clusters 74. If the signal injections from step 74 are stable 76, then the memory management method executes the following steps: receive set of historical external factor states 78; compute stability of signal injections versus external factors states 80; select two states to split cluster across 82 only if there is enough variance across the two states and enough data within each state (after splitting) to be able to drive decisions in each state (i.e., compute confidence intervals); and update set of historical clusters 84.

A cluster is a group of experimental units that are statistically equivalent with respect to the measure causal effects. Within a cluster, effects are measured free of bias and/or confounding effects from external factors, which guarantees that DCL is measuring causation and not just correlations/associations. Distribution of measured effects within each cluster are approximately normally distributed.

Table 1 provides an algorithm of an embodiment for automatically generating and applying causal knowledge for data storage and processing power management. This algorithm can be implemented in software or firmware for execution by processor 10.

TABLE 1

1  inject randomized controlled signals into data storage and processing power management based upon changes in data storage and processing power profiles and related parameters
2  ensure signal injections occur within normal operational ranges and constraints
3  monitor data storage and processing power performance in response to the signal injections
4  compute causal knowledge about the relationship between signal injections and monitored data storage and processing power performance
5  select optimal signals for the data storage and processing power performance based on current causal knowledge and possibly external data

The invention claimed is:

1. A method for active data storage management, comprising steps of:
    injecting randomized controlled signals into an electronic memory;
    storing repeated effect measures for each control signal;
    computing a marginal value of storing an additional effect measure in the memory for each control signal; and
    determining, based on available data storage capacity in the memory and the marginal value of an additional data point for each control signal, whether to accrue, replace or remove stored data points.

2. The method of claim 1, wherein the marginal value of storing an additional effect measure is defined as a difference between an increase in expected utility and an associated opportunity cost.

3. The method of claim 1, wherein the controlled signals comprise a size of the data.

4. The method of claim 1, wherein the controlled signals comprise storing the data in a long-term memory and in a short-term memory.

5. The method of claim 1, wherein the controlled signals comprise storing the data in a passive memory and in an active memory.

6. The method of claim 1, wherein the memory comprises a long-term high latency passive data storage and a short-term low latency active data storage.

7. A method for active data storage management, comprising steps of:
    injecting randomized controlled signals in storing of data in an electronic memory;
    ensuring the signal injections occur within normal operational ranges and constraints;
    monitoring performance of the memory in response to the controlled signals;
    computing confidence intervals about the causal relationships between the memory performance and the controlled signals; and
    selecting optimal signals for the storage of data in the memory based on the computed confidence intervals.

8. The method of claim 7, wherein the controlled signals comprise a size of the data.

9. The method of claim 7, wherein the controlled signals comprise storing the data in a long-term memory and in a short-term memory.

10. The method of claim 7, wherein the controlled signals comprise storing the data in a passive memory and in an active memory.

11. The method of claim 7, wherein the normal operational ranges comprise a multidimensional space of possible control states generated based on control information and operational constraints.

12. The method of claim 7, wherein the memory comprises a long-term high latency passive data storage and a short-term low latency active data storage.

13. A method for active data storage management, comprising steps of:
    providing signal injections for storing data in an electronic memory;
    receiving response signals corresponding with the signal injections;
    measuring a utility of the response signals;
    accessing parameters relating to storing the data in a long-term memory and in a short-term memory; and
    modifying the data based upon the utility of the response signals.

14. The method of claim 13, wherein the signal injections comprise a size of the data.

15. The method of claim 13, wherein the signal injections comprise storing the data in a long-term memory and in a short-term memory.

16. The method of claim 13, wherein the signal injections comprise storing the data in a passive memory and in an active memory.

17. The method of claim 13, wherein the signal injections have a spatial reach.

18. The method of claim 13, wherein the signal injections have a temporal reach.

19. The method of claim 13, wherein the modifying step further comprises modifying the parameters based upon external data.

20. The method of claim 13, wherein the memory comprises a long-term high latency passive data storage and a short-term low latency active data storage.

* * * * *